United States Patent [19]

Häuslein

[11] Patent Number: 4,815,366
[45] Date of Patent: Mar. 28, 1989

[54] COFFEE OR TEA MAKER

[75] Inventor: Reinhard Häuslein, Minden, Fed. Rep. of Germany

[73] Assignee: Melitta-Werke Bentz & Sohn, Minden, Fed. Rep. of Germany

[21] Appl. No.: 135,374

[22] Filed: Dec. 21, 1987

[30] Foreign Application Priority Data

Dec. 22, 1986 [DE] Fed. Rep. of Germany ....... 3643877

[51] Int. Cl.⁴ .............................................. A47J 31/00
[52] U.S. Cl. ........................................ 99/283; 99/305; 99/307
[58] Field of Search ................. 99/279, 280, 281, 282, 99/283, 307, 304, 305, 300, 299, 295, 302 R; 426/433

[56] References Cited

U.S. PATENT DOCUMENTS

| 3,100,434 | 8/1963 | Bunn | 99/305 |
| 3,179,035 | 4/1965 | Lockett | 99/305 |
| 4,143,589 | 3/1979 | Weber | 99/302 R |
| 4,473,003 | 9/1984 | Stone | 99/305 |

Primary Examiner—Robert W. Jenkins
Attorney, Agent, or Firm—Spencer & Frank

[57] ABSTRACT

A coffee or tea maker includes a freshwater container, a heater for heating water withdrawn from the freshwater container, a filter holder receptacle and a feed pipe extending from the heater and arranged for carrying hot water from the heater; an intermediate container into which the feed pipe opens to introduce hot water thereinto. There is further provided an arrangement for periodically emptying the hot water from the intermediate container into the filter holder receptacle.

7 Claims, 3 Drawing Sheets

COFFEE OR TEA MAKER

BACKGROUND OF THE INVENTION

The present invention pertains to a coffee or tea maker having a freshwater container, a continuous flow heater, an ascending feed pipe as well as an overflow for feeding the heated water into a filter holder receptacle arranged above a pot which is designed to receive the filtrate.

Coffee or tea makers of the kind described above are well known and are predominantly used in households and offices. In coffee or tea makers known in the prior art, cold water supplied to the freshwater container is heated by means of a continuous flow heater and is fed through an overflow assembly to the filter holder by gravity.

Due to the power rating of conventional continuous flow heaters, the influx speed of the heated water into the filter holder is relatively low. Moreover, conventional systems form a comparatively thin stream of water. As a result of these two circumstances, the flavor source located in the filter holder receptacle is not optimally saturated at the beginning of the filtering process.

Coffee or tea makers are known in which hot water can be fed into a filter holder at a relatively high flow speed and in a comparatively large amount. However, such coffee or tea makers are installed in eating establishments and are provided either with a vapor pressure system or with other tanks, which are connected to the main water system.

In addition, irrespective of the fact that such coffee or tea makers are quite large, adoption of their construction principles for household coffee or tea makers would be neither practical nor economically feasible.

SUMMARY OF THE INVENTION

The purpose of the present invention is to improve a coffee or tea maker of the type known in the prior art in such a manner that heated water can be transported into the filter holder on a periodic basis and in larger quantities per time unit than has been possible in the past and to achieve this goal with comparatively little constructive and technical effort.

This object and others to become apparent as the specification progresses, are accomplished by the invention, according to which, briefly stated, the ascending feed pipe is so arranged that it discharges into an intermediate container which is part of an overflow assembly and which is periodically emptied so that its usable capacity equals a fraction of the total capacity of the freshwater container.

It is an advantage of the invention that the brew water is introduced in portions into the filter holder so that the influx of these portions into the filter holder occurs in a shorter time than by direct introduction of the brew water through an ascending feed pipe and an overflow assembly according to the prior art.

Initially, a predetermined amount of water heated by the continuous flow heater is collected in the intermediate container. This portion of the total brew water can then be fed into the filter holder within a very short time period and with a comparatively high admission speed after activation of the discharge opening of the intermediate container, resulting in a distinct advantage, especially in the beginning of the filtering process, since, in this way, a fast, complete and uniform saturation of the flavor source can occur.

The invention is not limited to the description provided above as other embodiments are also possible. For example, it is possible to use a pump for emptying the intermediate container. The pump can be activated at prespecified time intervals for similarly predetermined time periods so that portions of water collected in the intermediate container are transferred into the filter holder within a very short time period.

The brew water in the intermediate container can also be transferred into the filter holder in a free fall. For that purpose, it is merely necessary to provide a closing device in the drainage area of the intermediate container, which functions to close the discharge opening during the collection phase and to open it during the discharge phase.

DESCRIPTION OF THE PREFERRED EMBODIMENTS

Figure 1:
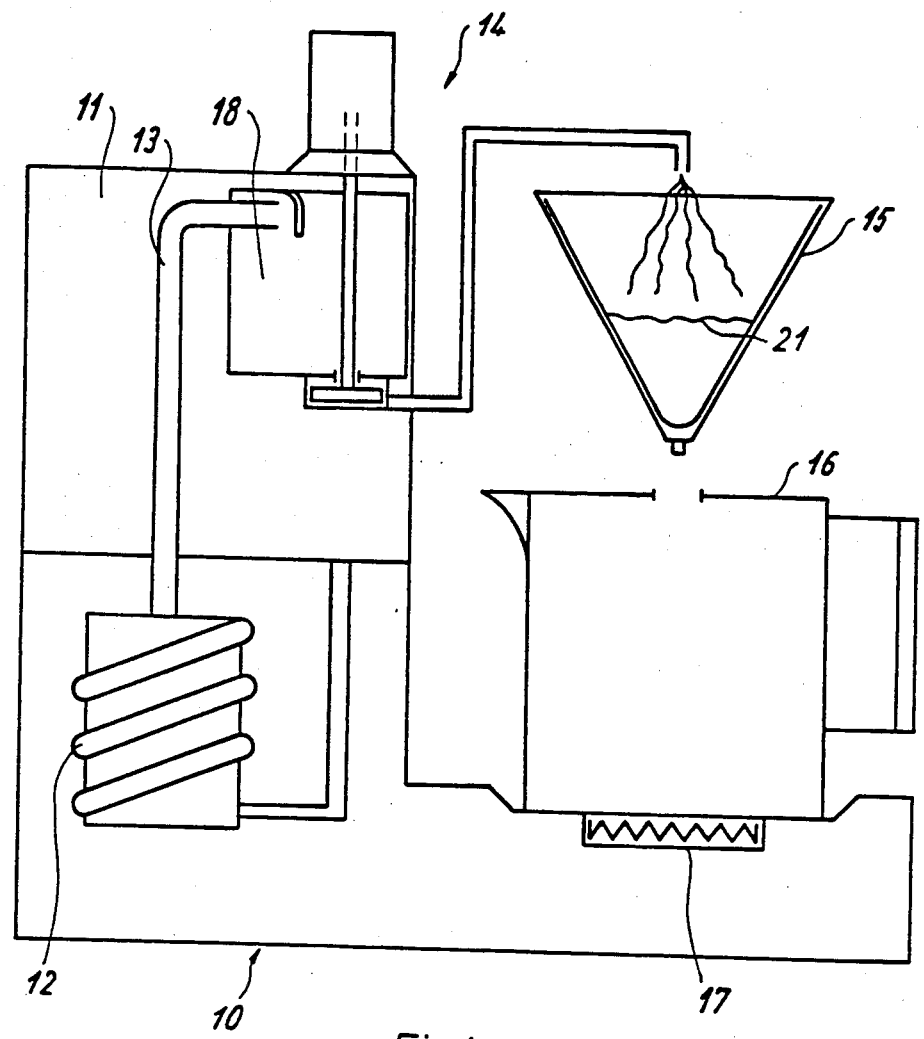
FIG. 1 is a schematic side elevational view of a preferred embodiment of the invention.

In FIG. 1, a coffee or tea maker generally indicated at 10 has the basic structure of coffee or tea makers for household use. A predetermined amount of cold water is poured into a freshwater container 11. The cold water is heated by a continuous flow heater 12 and is introduced through an ascending feed pipe 13 past overflow assembly 14 into a filter holder receptacle 15 which is located above a filtrate holding pot 16 which normally stands on a warming plate 17.

Figure 2:
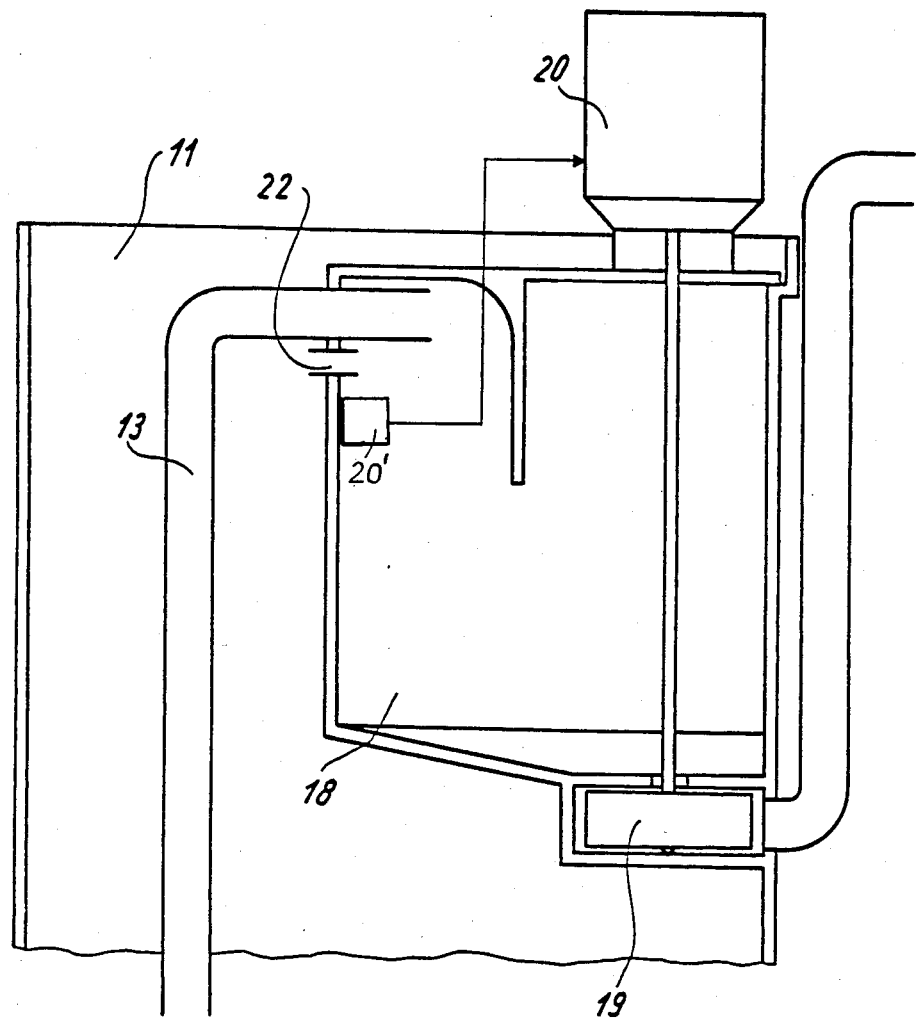
FIG. 2 shows a magnified view of a detail of the preferred embodiment shown in FIG. 1.

The overflow assembly 14 is provided with an intermediate container 18 which is shown in greater detail in FIG. 2. As seen, the ascending feed pipe 13 opens into the intermediate container 18 which means that the heated water is first introduced into intermediate container 18. The latter may collect a predetermined amount of heated water which is considerably less than the total amount of water which can be supplied to the freshwater holder 11. Furthermore, a pump 19, operable by means of a motor 20, is located in the discharge area of the intermediate container 18 at its lowest point. The pump 19 drives the heated water collected in intermediate container 18 in a relatively short time into the filter holder 15 so that the flavor source 21 in the filter holder 15 can be quickly and uniformly saturated. The intermediate container 18 is provided with a vent 22 so that the pump 19 does not work against a vacuum in the intermediate container 18. The pump motor 20 may be intermittently energized, for example, by a signal emitted by a sensor 20' which responds to a predetermined water level in the intermediate container 18.

Figure 3:
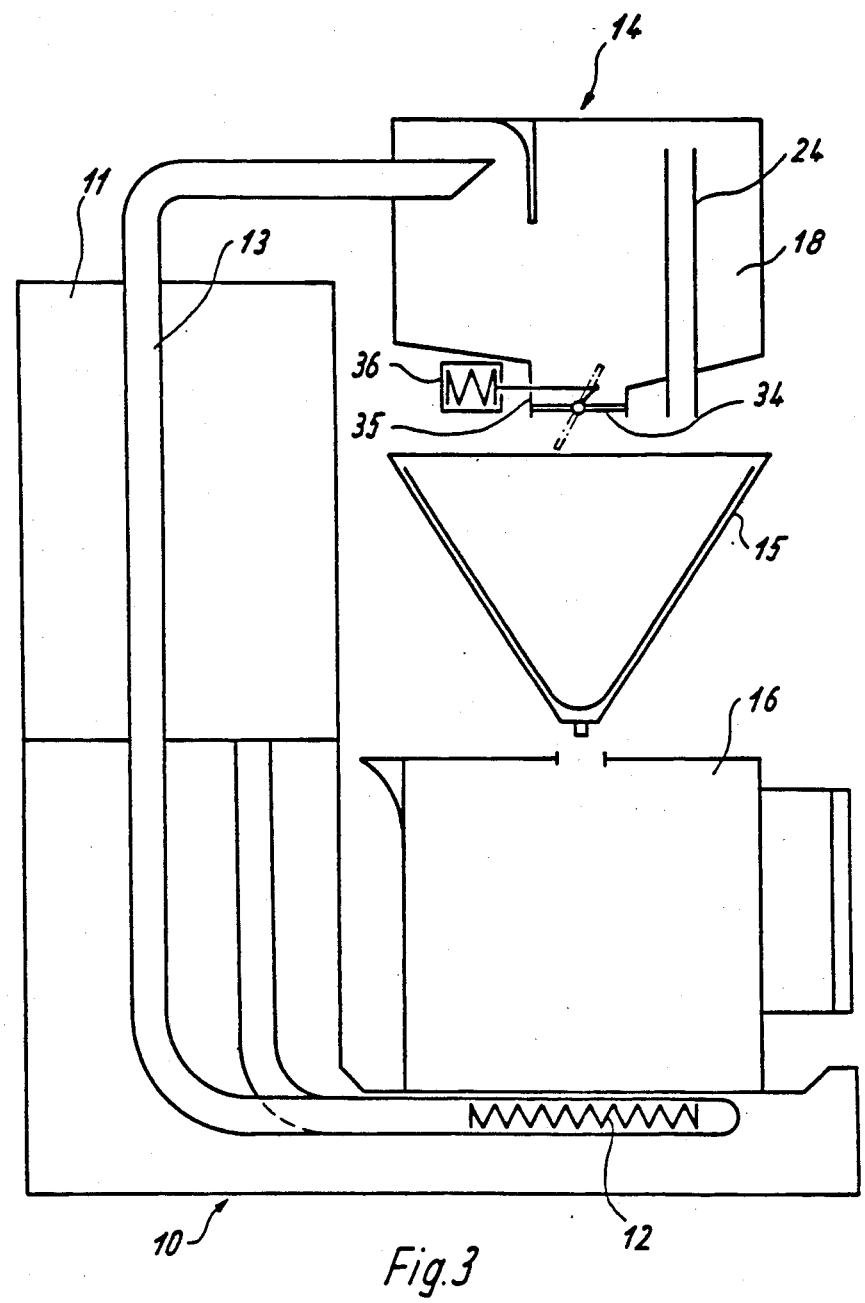
FIG. 3 is a schematic side elevational view of another preferred embodiment of the invention.

FIG. 3 shows another embodiment of the invention wherein an outlet 35 of the intermediate container 18 is controlled by a pivotal shutoff gate 34. The outlet 35 is positioned centrally over the filter holder 15. The gate 34 can be operated, for example, by an automatic switching arrangement 36, such as a magnetic switch, although other methods of operation are possible such as an electrically activated lifting gear or a bimetallic switch or a water level sensor similar to device 20' of the embodiment according to FIG. 2. Similarly to the earlier-described embodiment, the heated brew water is first fed into the closed intermediate container 18. As soon as a predetermined amount of heated water has been fed in, the gate 34 is opened so that the brew water located in intermediate container 18 can flow freely in a very short time period into the filter holder 15.

In both described embodiments it is feasible to make the intermediate container 18 heatable in order to reliably avoid heat loss during the collection phase.

The need for an additional heater can be avoided either through the use of especially good insulation in intermediate container 18, or by keeping the time period during which hot water is collected in intermediate container 18 quite short.

The present disclosure relates to subject matter contained in Federal Republic of Germany Patent Application No. P 36 43 877.4 (filed Dec. 22nd, 1986) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a coffee or tea maker including
   a freshwater container;
   heating means for heating water withdrawn from said freshwater container;
   a filter holder receptacle arranged for receiving a filter and a dosage of coffee or tea to be brewed by hot water during a brewing process; and
   a feed pipe extending from said heating means and being arranged for carrying hot water from said heating means;
   the improvement comprising
   (a) an intermediate container; said feed pipe opening into said intermediate container to introduce hot water thereinto;
   (b) a guide means for guiding water from said intermediate container directly into said filter holder receptacle for effecting the brewing process;
   (c) emptying means having an operating state for causing hot water to be rapidly introduced from the intermediate container into said filter holder receptacle; said emptying means having a non-operating state in which no water flow from the intermediate container into the filter holder receptacle occurs; and
   (d) control means connected to said emptying means for automatically periodically placing said emptying means into the operating state for automatically intermittently and in increments introducing hot water from said intermediate container into said filter holder receptacle during each brewing process.

2. A coffee or tea maker as defined in claim 1, wherein said emptying means comprises a pump arranged for drawing water from said intermediate container and a motor connected to said pump for driving said pump.

3. A coffee or tea maker as defined in claim 1, wherein said control means comprises a water level sensor means for generating a signal in response to a predetermined level of water in said intermediate container.

4. A coffee or tea maker as defined in claim 1, wherein said intermediate container has a capacity which is a fraction of the capacity of said freshwater container.

5. A coffee or tea maker as defined in claim 1, wherein said emptying means comprises an outlet opening provided in said intermediate container and an openable and closable shutoff gate arranged at said outlet opening of said intermediate container for controlling discharge of water therefrom.

6. A coffee or tea maker as defined in claim 5, wherein said shutoff gate is pivotally supported in said intermediate container for swinging movements between open and closed positions.

7. A coffee or tea maker as defined in claim 5, wherein said outlet opening is defined by an outlet nipple affixed to said intermediate container; said gate being arranged in said outlet nipple.

* * * * *